US012662281B2

(12) United States Patent
Najjar et al.

(10) Patent No.: US 12,662,281 B2
(45) Date of Patent: Jun. 23, 2026

(54) HIGH-RATE LABEL APPLICATOR METHOD AND APPARATUS

(71) Applicant: Dematic Corp., Grand Rapids, MI (US)

(72) Inventors: Khalil Najjar, Brecksville, OH (US); Michael Hildebrand, Brecksville, OH (US)

(73) Assignee: Dematic Corp., Grand Rapids, MI (US)

( * ) Notice: Subject to any disclaimer, the term of this patent is extended or adjusted under 35 U.S.C. 154(b) by 65 days.

(21) Appl. No.: 18/483,902

(22) Filed: Oct. 10, 2023

(65) Prior Publication Data

US 2024/0116664 A1 Apr. 11, 2024

Related U.S. Application Data

(60) Provisional application No. 63/414,676, filed on Oct. 10, 2022.

(51) Int. Cl.
*B65C 9/40* (2006.01)
*B65C 9/02* (2006.01)
(Continued)

(52) U.S. Cl.
CPC .................. *B65C 9/40* (2013.01); *B65C 9/02* (2013.01); *B65C 9/28* (2013.01); *B65C 9/46* (2013.01);
(Continued)

(58) Field of Classification Search
CPC .... B65C 9/40; B65C 9/02; B65C 9/28; B65C 9/46; B65C 2009/401; B65C 2009/404; B65C 2009/408
See application file for complete search history.

(56) References Cited

U.S. PATENT DOCUMENTS 10,647,522 B1 * 5/2020 Watson .................... B65C 9/26
2005/0167024 A1 * 8/2005 Sanzone .................. B65C 9/28 156/64
(Continued)

FOREIGN PATENT DOCUMENTS

WO WO-2021236665 A1 * 11/2021 ............ B65C 1/021
WO WO-2022153312 A1 * 7/2022 ........... B25J 9/0093

OTHER PUBLICATIONS

International Search Report and Written Opinion from corresponding Patent Cooperation Treaty (PCT) Application No. PCT/IB23/60187, completed Dec. 7, 2023 and mailed Jan. 9, 2024.

*Primary Examiner* — George R Koch
(74) *Attorney, Agent, or Firm* — Gardner, Linn, Burkhart & Ondersma LLP

(57) ABSTRACT

An auto sort and label (ASL) system includes a conveyor, a controller, a sensor, and a label, print, and apply (LPA) system. The conveyor conveys articles through the ASL system. The sensor is positioned along the conveyor and identifies an article. The controller receives sensor data from the sensor. The LPA is positioned alongside the conveyor and prints labels in sequence with the corresponding article as it travels along the conveyor and applies the labels to the corresponding articles as the article passes the LPA. The controller controls the conveyor such that a gap and/or pitch between a first article and a second article is adjusted to an optimal distance to match the operation capability of the LPA. The controller verifies placement and contents of the label upon the article as defined by sensor data and accepts or rejects the labeled article for further handling based on the verification.

21 Claims, 4 Drawing Sheets

(51) Int. Cl.
*B65C 9/28* (2006.01)
*B65C 9/46* (2006.01)

(52) U.S. Cl.
CPC .. *B65C 2009/401* (2013.01); *B65C 2009/404* (2013.01); *B65C 2009/408* (2013.01)

(56) References Cited

U.S. PATENT DOCUMENTS

| | | | | |
|---|---|---|---|---|
| 2012/0138512 | A1* | 6/2012 | Jones | B07C 5/363<br>209/552 |
| 2012/0305638 | A1* | 12/2012 | Szesko | G16H 20/13<br>235/375 |
| 2013/0270422 | A1* | 10/2013 | Grinberg | F16P 3/144<br>250/208.2 |
| 2014/0277698 | A1* | 9/2014 | Combs | G05B 19/4189<br>198/460.1 |
| 2020/0160011 | A1* | 5/2020 | Wagner | B65G 47/12 |
| 2022/0097892 | A1* | 3/2022 | Wen | B65C 9/44 |

* cited by examiner

HIGH-RATE LABEL APPLICATOR METHOD AND APPARATUS

CROSS REFERENCE TO RELATED APPLICATION

This present invention claims priority of U.S. provisional application Ser. No. 63/414,676, filed on Oct. 10, 2022, which is incorporated by reference herein in its entirety.

FIELD OF THE INVENTION

The present invention is directed to item labeling architecture, and in particular, to a high-rate, wide range of materials to be handled (MTBH) label applicator architecture.

BACKGROUND OF THE INVENTION

Conventional item labeling techniques typically include a variety of conveyors or conveyor modules, with various sizes and arrangements available based on the size and characteristics of the MTBH for a particular label applicator. MTBH may include parcels, envelopes, boxes, cartons, items, object, articles, etc. Such conveyors typically utilize large 480 VAC motors and drive belts to drive conveyor sections, which may include a skewed induction bed to align the articles and/or to gap or pitch the articles to a desired distance between one another. Alignment, gapping, and/or pitching may be performed manually by an operator. After gapping, the articles are scanned to identify the article. This identification information is sent to a host or system controller which responds by sending a print file for the article to a label printer and applicator. Common labeling systems transfer label print files to the label printer via a file transfer protocol (FTP). The printer and applicator receives the print file, and once the article is present, prints the label and applies the printed label to the present article. After receiving the printed label, the article continues down a conveyor surface for verification where the printed label is inspected to ensure that the printed label is readable and contains the correct information for the article upon which it is affixed. An article that passes verification continues on for further processing (e.g., a downstream conveyor to shipping or loading dock), while an article that fails verification is typically manually removed by an operator from the conveyor system.

SUMMARY OF THE INVENTION

The present invention provides a high-rate, wide range of material to be handled (MTBH), and robust label applicator architecture and control method, which includes a label, print, and apply (LPA) system, apparatus, or module which utilizes a less-expensive and more robust hardware and software architecture than conventional systems by improving accuracy of article labeling, improved overall uptime, and improved labeling rate for a significantly wide MTBH range of articles, items, parcels, packages, cartons, boxes, envelopes, etc. The labeling rate and continuous operation of the LPA is improved by dynamically adjusting the gap and pitch between articles as they enter an auto sort and label system. The LPA may be provided in the form of conventional or known LPA systems, such as those configured for contactless label application and utilizing servo motors.

According to an aspect of the present invention, an exemplary auto sort and label (ASL) system includes a conveyor, a controller, a sensor array, and a label, print, and apply (LPA) system, apparatus, or module. The conveyor conveys articles through the ASL system. The sensor array is positioned along the conveyor and IDs an article and determines dimensions of the article. The controller receives sensor data from the sensor array. The LPA is positioned alongside and in-line with the conveyor and prints labels and applies them to articles. The controller selects print strings (as opposed to print files) defined by the ID of the article determined from the sensor data. The LPA prints the label as defined by the print string. The controller controls the conveyor such that a gap/pitch between a first article and a second article is adjusted. The controller verifies placement and contents of the label upon the article as defined by sensor data and accepts or rejects the labeled article for further handling based on the verification.

In an aspect of the present invention, the at least one sensor comprises a first sensor array configured to determine an identity of each article of the plurality of articles. The at least one sensor comprises a second sensor array configured to verify the labeled article. In another aspect of the present invention, the first sensor array and the second sensor array are part of a single sensor array.

In a further aspect of the present invention, the conveyor comprises a plurality of individually addressable motorized driven rollers (MDR). The MDRs are controlled by the controller.

In yet another aspect of the present invention, the at least one sensor array comprises a plurality of cameras, a plurality of barcode scanners, and/or a plurality of photo eyes. The sensor array may be configured and function similar to systems and methods described in commonly owned and assigned U.S. Patent Application Publication No. 2020/0095064A1, published on Mar. 26, 2020, the disclosure of which is hereby incorporated by reference herein in its entirety.

In an aspect of the present invention, the LPA comprises a label applicator configured to apply the label to an article by releasing a measured quantity of air to blow the label onto the article. The controller and/or the LPA is configured to determine whether a current print string matches the next article. The label applicator is configured to blow off the label into the air, such as when the print string does not match the next article, or if there is insufficient time to print and apply a label to a subsequent article due to insufficient minimum pitch/gap requirement.

In another aspect of the present invention, the controller is configured to direct the conveyor to allow a verified article of the plurality of articles to proceed downstream to further handling. The controller is configured to direct the conveyor to kick an unverified article of the plurality of articles off the conveyor, such onto a diagonal conveyor or chute or into a holding bin away from the main conveyor line for further handling.

In a further aspect of the present invention, the LPA is configured to handle and apply labels onto a wide range of material to be handled (MTBH), which comprises articles of 3 mm thick padded envelopes that weigh under 1 pound, up to packages 25 inches tall that weight up to 60 pounds.

These and other objects, advantages, purposes and features of this invention will become apparent upon review of the following specification in conjunction with the drawings.

DESCRIPTION OF THE PREFERRED EMBODIMENTS

Figure 1:
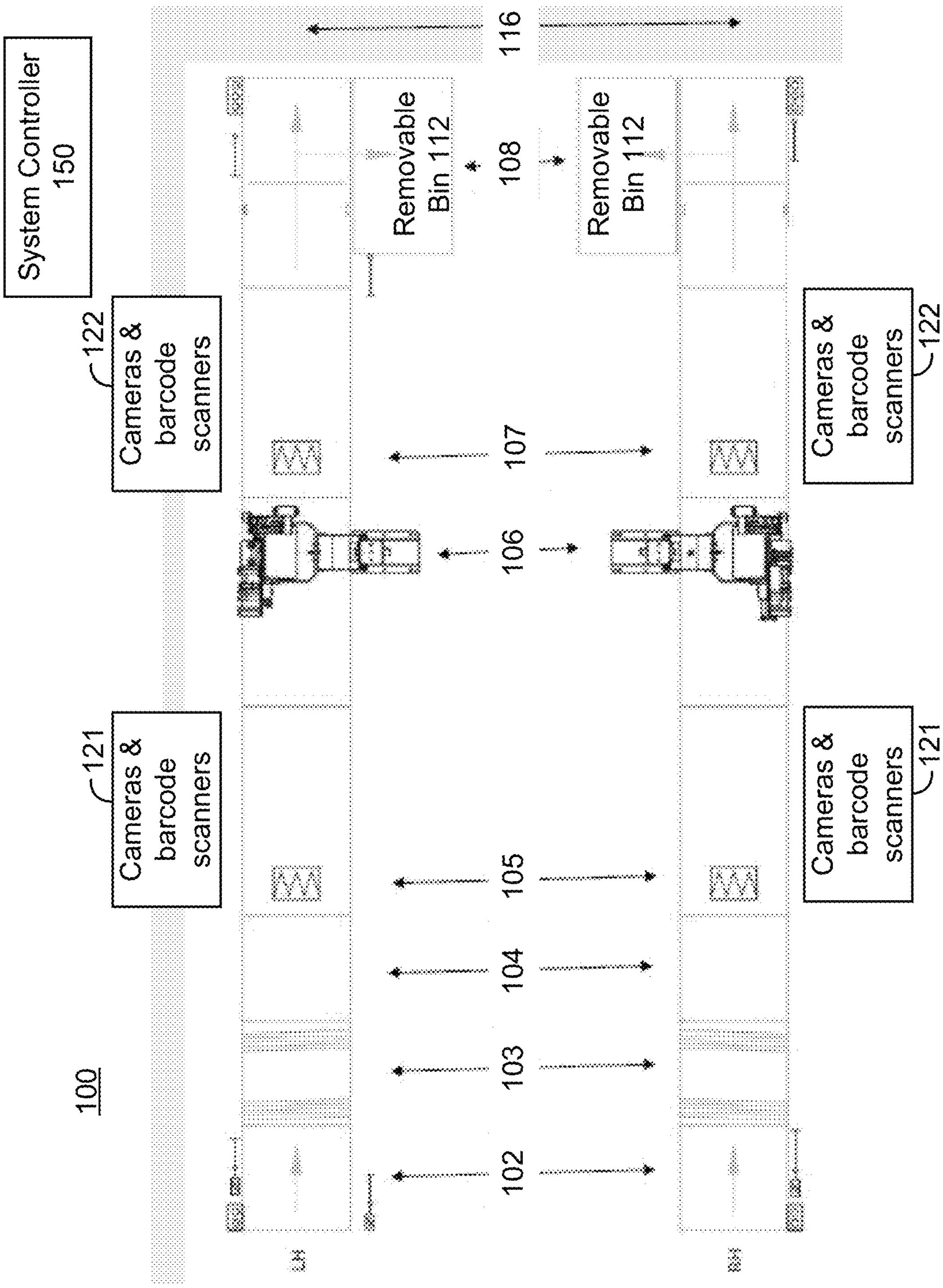
FIG. 1 is a plan view of an auto sort and label system in accordance with an embodiment of the invention.

The present invention will now be described with reference to the accompanying figures, wherein the numbered elements in the following written description correspond to like-numbered elements in the figures.

Referring now to the drawings and the illustrative embodiment depicted therein, exemplary auto sort and label ("ASL") systems 100 (FIG. 1), and 200 (FIG. 2) and a method 300 (FIG. 3) are provided that, among other features, dynamically adjust the gapping and pitch between articles depending on the articles already downstream in the ASL system. It will be appreciated that exemplary ASL systems 100 and 200 and substantially similar in structure and function, with some differences described throughout this disclosure. As illustrated in FIG. 2, sensor arrays 220 and 222 are used to track the movement of articles as they enter and proceed through the ASL system 200. The sensor arrays may be formed of an arrangement of a plurality of photoeyes directed toward the conveyor surface of the gapping bed 203, scanning bed 204, LPA applicator bed 205, and/or verification bed 206. By tracking the articles with sensor array 220, the position of an article with respect to articles downstream is determined. Based upon this position with respect to articles downstream, a gap and/or pitch distance between articles can be dynamically adjusted prior to the article reaching the labeling architecture. Wherein gapping refers to a space between a trailing edge of a downstream article and a leading edge of an immediately upstream article and pitching refers to a space between a leading edge of a downstream article and a leading edge of an immediately upstream article. Thus, the ASL systems 100, 200 are operable to dynamically adjust the gap distance and/or the pitch distance between adjacent articles passing through the system. By optimizing the gap and/or pitch between articles, the system can be optimize or increase article throughput by ensuring that the labeling machine ("LPA") is operating in a most efficient and continuous manner.

Figure 2:
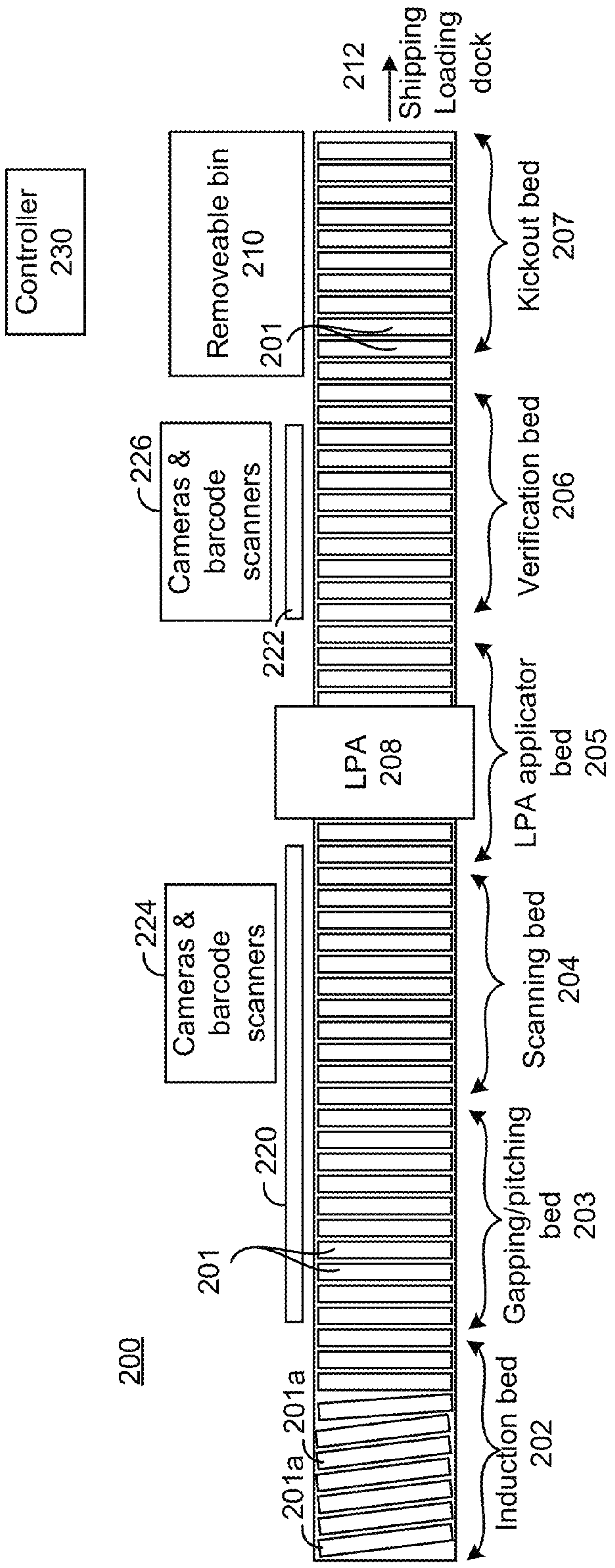
FIG. 2 is a plan view of an alternative auto sort and label system in accordance with an embodiment of the invention.

FIG. 1 illustrates an exemplary ASL system 100 that comprises a left-hand conveyor and a right-hand conveyor. Each conveyor begins with an induction conveyor 102, where articles are placed upon the conveyor to be conveyed to an aligning bed 103 having skewed rollers oriented in such a manner as to at least partially reposition or realign the articles toward either the right- or left-hand edge of the conveyor, respectively. After passing through the aligning bed 103, the aligned articles are moved to a gapping bed 104 where the articles are dynamically gapped and/or pitched to maximize LPA utilization. In an aspect of the embodiment, the gapping bed utilizes individually addressable motor driven rollers (MDR) to automatically gap and/or pitch the articles for a pre-selected or desired gap and/or pitch between articles. A scanning bed 105 downstream of the gapping bed 104 scans the articles for any indicia indicating what the article is (e.g. a barcode, QR code, etc.). The scanning bed 105 utilizes individually addressable MDRs to move articles along the conveyor. It will be appreciated that the individually addressable MDR of the gapping bed 104, scanning bed 105, and/or at any other segments of the ASL system 100 may be provided within each roller along the conveyor system, or may be utilized to drive a belt positioned over the MDR and a plurality of idle rollers, for example. An arrangement of cameras and/or barcode scanners 121 are used to scan the articles moving along the scanning bed 105. The article's data (retrieved by the scanning) is sent to a host or system controller 150, wherein the controller 150 may comprise a computer device comprising one or more processors as well as hardware and software, including for performing the operations discussed herein. The system controller 150 retrieves an encoded data string from the host system based on the article's data and sends the encoded print data string to the LPA 106.

The LPA 106 receives the print data string from the system controller 150, and using the encoded print data, prints a label for the article. With the label printed, the LPA 106 is ready to apply the label to the article once the article is moved by the conveyor to the LPA 106. Dynamic gapping and pitching ensures the label is ready prior to the article arriving at the LPA 106 such that the label may be applied seamlessly as the article passes through the LPA 106, preferably without the article stopping or slowing down. In an aspect of the present embodiment, the LPA 106 applies the label to the article by pre-positioning the applicator slightly above the article then blowing the label onto the article once the article has arrived at the point of application at the LPA 106. After application of the label onto the article, the article is conveyed by the conveyor to a verification bed 107 where another set of cameras and/or barcode scanners 122 scan the applied label(s) on the article as well as the original article identifier. The system controller 150 uses the cameras and/or barcode scanners 122 to confirm that the applied label is printed legibly, includes the correct information, and confirms that the printed label is the correct label for the article upon which it is affixed using the original article identifier barcode and the tracking of the article to the application location. The cameras and/or barcode scanners 121 and 122 may be configured and function similar to systems and methods described in previously mentioned U.S. Patent Application Publication No. 2020/0095064A1.

The verification bed 107 and an accompanying kickoff conveyor are capable of automatically removing articles without labels or misapplied labels without stopping the conveyor line and without the need for manual intervention from an operator. In an optional embodiment, if the system controller 150 successfully verifies the article's label, a green beacon illuminates to indicate that the article will be discharged from the verification bed 107 to be received by a downstream conveyor 116, such as for delivery to a loading dock or shipping area, for example. If the article label is not verified successfully, a red beacon illuminates to indicate that the article will be removed from the conveyor and pushed into a rejection hamper or bin 112 or kicked off onto the adjacent kickoff conveyor for further correction. Alternatively, the system 100 may be configured such that an operator may manually remove articles upon indication from the red beacon.

FIG. 2 illustrates another exemplary alternative ASL system 200 that is substantially similar to ASL system 100, with some differences described herein. The ASL system 200 includes a roller conveyor that utilizes an array of individually addressable motorized driven roller (MDR) 201 sets with direct control by a controller 230 (as opposed to a belt on roller configuration). The controller 230 may comprise a computer device comprising one or more processors as well as hardware and software, including for performing the operations discussed herein Rather than tracking the speed of articles moving down the conveyor, the ASL system 200 utilizes sensor arrays 220, 222 along the conveyor and the MDRs are controlled to transport the articles in a uniform manner and to dynamically adjust the gapping and/or pitch of the articles when necessary to ensure that the downstream LPA 208 is not over or under-utilized (the LPA 208 is described in further detail below). While a single track or line of roller conveyor is illustrated in FIG. 2, a plurality of tracks or lines of roller conveyors can be utilized (as illustrated in FIG. 1) to meet throughput requirements of a facility or as otherwise desired.

Similar to the ASL system 100, the alternative ASL system 200 includes an induction bed 202 with at least a portion having an arrangement of skewed rollers 201*a* (which may be provided in the form of MDR 201) to shift, reposition, or realign the articles such that they align to either the right- or left-hand side of the conveyor depending on the skew arrangement (in the illustrative embodiment of FIG. 2, the skew arrangement should cause articles to shift or move toward the left-hand side of the conveyor). The articles are placed upon the induction bed 202 and aligned as they move toward the gapping/pitching bed 203. Once an article reaches the gapping/pitching bed 203, an array of sensors 220 (e.g., photo eye sensors or other similar sensor technology) is used to track the article along the conveyor surface and determine its dimensions and position with respect to one or more downstream articles (i.e. articles having already passed the gapping bed 203). In a preferred embodiment, the array of sensors 220 includes a set of individual array sensors, each adapted to detect articles as they pass along the conveyor. In an exemplary embodiment, each of the array sensors is operable to detect articles as small as five millimeters (5 mm), and preferably articles as small as or smaller than two millimeters (2 mm).

Using the MDR sets, the article's position with respect to the previous or immediately preceding article on the conveyor is adjusted by the controller 230 for a desired gapping and/or pitch. As discussed previously, a gapping is a physical space or distance between two articles on the conveyor surface, while pitch is the physical space or distance between the leading edges of two articles on the conveyor surface (or alternatively the pitch may be measured as the distance between the trailing edges of two articles if that is a more useful data point). The selected or predefined gap and/or pitch distancing optimizes a ratio between the gap and/or pitch based on the previously scanned articles. That is, the controller 230 dynamically adjusts the gapping and/or pitch between articles based upon the dimensions of the previously scanned articles. The controller 230 is configured to dynamically correct non-ideal or incorrect gapping/pitching between articles prior to the article entering the scanning bed 204 and/or LPA bed 205 and LPA 208. The controller 230 controls the MDR rollers to individually adjust their rotation rate to correct or adjust the gapping/pitch between the articles and thereby increase or decrease the gap and/or increase or decrease the pitch. Such adjustment can be used to match the previous gap/pitch between previous upstream articles to create a uniform flow of articles through the scanning bed 204 and LPA bed 205.

The ASL system 200 includes a scanning bed 204 after the gapping/pitching bed 203 (FIG. 2). In the illustrated embodiment, the sensor array 220 extends along both the gapping/pitching bed 203 and the scanning bed 204. The sensor array 220 is operable to identify the articles (e.g., determine an article's ID/identification data, dimensions, weight, etc.). Such identification of articles may also be performed by an arrangement of cameras and barcode scanners 224 in addition to or as an alternative to the sensor array 220. The identification data is provided to the controller 230 which generates an encoded print data string for a printer to print a label. In an aspect of the current embodiment, the arrangement of cameras includes a three-camera system that scans the articles for codes/labels on the articles as the articles pass through the scanning bed 204 of the conveyor. Information from the three-camera system may also enable the controller 230 to determine the orientation of an article in relation to the conveyor surface and the adjacent systems. In another aspect of the current embodiment, the controller 230 utilizes a multi-variant matching algorithm to determine the identity of the article based on the scan information. The controller 230 responds to the scan information from the sensor array 220 and/or cameras and barcode scanners 224 and sends information to the printer at an LPA 208 to generate the label required for the article.

Leaving the scanning bed 204, the articles move along the conveyor to enter an LPA applicator bed 205 of the ASL system 200. As illustrated in FIG. 2, the LPA applicator bed 205 includes a "Label, Print, and Apply" (LPA) 208. The LPA 208 is configured to print labels and apply those labels to a wide range of articles or "Materials to be Handled" (MTBH). In an exemplary embodiment, the controller 230 utilizes scan data from the sensor array 220 (and/or cameras and barcode scanners) to call up the label for the incoming article. For example, the label for the incoming article may be provided in zebra programming language (ZPL) as commonly known in label printing applications. The host, i.e. controller 230, sends an encoded ZPL data string (i.e. label data) directly to the printer of the LPA 208. This architecture differs from commonly known architecture in which the host or controller transmits ZPL files to the printer via a file transfer protocol (FTP). The exemplary embodiment provides the ZPL data string to the printer in a significantly shorter period compared to known architectures. This additionally allows the hardware controller to have visibility to the applied label (e.g. codes), which may be utilized to improve or enable label application validation.

The articles handled by the system 200 (and system 100 as well) may vary significantly, such as from padded envelopes to large boxes. For example, in an aspect of the present embodiment, the MTBH includes articles of 3 mm thick envelopes weighing less than a pound, up to 25-inch-tall packages weighing up to 60 pounds. Note that many articles may have a non-uniform profile, such as polybags or non-uniform polygonal cartons. Product inside the polybags may create an inconsistent profile of the polybag which may result in difficulties in article tracking, scanning, label application and sortation. The exemplary embodiments include sufficient scanning (via the sensor array 220) and article handling (via the MDAs of the gapping/pitching bed 203) to handle a wide variety of articles. The controller 230 is configured to dynamically correct non-ideal or incorrect gapping/pitching between articles while the article is present in either the gapping bed 203, scanning bed 204, and/or LPA bed 205/LPA 208, which further provides dynamic control of the system 200 which may reduce the need to stop the ASL system 200 to correct for mislabeled, unlabeled, or out of sequence articles.

In an aspect of the present embodiment, after printing the label, the LPA 208 utilizes a "blow on" label applicator, which blows the printed label onto the article. This is opposed to rolling, pressing, or other physical interactions with the articles, such that during label placement, the LPA 208 will not crush or substantially contact the article. The label applicator of the LPA 208 may be provided at the end of an articulating robotic arm or manipulator that is moveable in multiple directions and coordinates. Preferably, the LPA 208 arm is prepositioned prior to label application based on the article height to maximize LPA 208 throughput. If the LPA 208 (and/or the controller 230) determines that an already printed label is out of sequence with the article approaching the LPA bed 205 or that an article has entered the LPA applicator bed 205 with insufficient gap/pitch to adequately apply its label, the LPA 208 is configured to purge the already printed label. As noted herein, the LPA 208 utilizes a blow on label applicator. Thus, when a printed label is to be purged, the blow on label applicator will be instructed to physically blow the label into the air to waste (i.e. blow the label away from the conveyer system). Note that during the brief period of time when the LPA 208 is blowing off an incorrectly printed label, the ASL system 200 may briefly pause or at least slow down induction of new articles onto scanning bed 204, but not significantly interrupt the flow of articles in the system 200. Thus, the ASL system 200 allows for automatic recovery in the event the LPA 208 incorrectly prints a label without requiring line stoppage. An exemplary LPA 208 may include a ZE511 printer marketed under the mark ZEBRA® by Zebra Technologies Corporation of Lincolnshire, Illinois, and an LA-6000 variable height printer applicator from WEBER® Packaging Solutions of Arlington Heights, Illinois, or similar LPA configurations.

As illustrated in FIG. 2, the ASL system 200 includes a verification bed 206 which is adjacent to the LPA applicator bed 205. A second sensor array 222 is arranged along the verification bed 206. A set of cameras and barcode scanners 226 may also be arranged alongside the verification bed 206 in addition to or as an alternative to the sensor array 222. Based on information received from the sensor array 222 and/or the set of cameras and barcode scanners 226, the controller 230 verifies the article with respect to the contents of the label (to ensure the label is affixed to the correct article) and whether the label is clearly printed (i.e. legible or readable for further processing). In an aspect of the present embodiment, the verification is accomplished with the use of another multi-variant matching algorithm to verify the article received the proper label from the applicator and that the label is sufficiently readable. This multi-variant matching algorithm may be configured in similar manner or in a different manner than the one provided at the scanning bed 204.

It is contemplated that the sensor arrays 220 and 222 are considered to comprise the cameras and/or barcode scanners 224 and 226. However, it will be appreciated that the sensors arrays 220 and 222 may be utilized independent of the cameras and/or barcode scanners 224 and 226. It will also be appreciated that only one type of sensor, in the form of either photoeyes, cameras, or code scanners, may be utilized without affecting the function of the system 200. The sensor arrays 220 and 222 and cameras and/or barcode scanners 224 and 226 may be configured and function similar to systems and methods described in previously mentioned U.S. Patent Application Publication No. 2020/0095064A1.

A next section of the conveyor of the ASL system 200 includes a kickout bed 207 which is configured to "kick out" or reject articles from the conveyor surface by kicking them off the conveyor surface of the kickout bed 207 (such as into a removable bin 210 alongside the bed 207 or to another discharge conveyor adjacent the bed 207) to be retained for or redirected to quality assurance (QA) operators, which can manually correct or apply replacement labels. Thus, the kickout bed 207 allows for automatic recovery in the event the LPA 208 applies a label out of sequence, or prints a label that is not sufficiently readable, or when an article is not sufficiently gapped/pitched when it enters the LPA, such that there is no significant line stoppage. In the event that a label has been improperly printed (e.g. out of sequence) and detected before application to an article, the label is blown off into the air. At this time the article (without a label) is rejected while passing through the verification bed 206 and is kicked out by the kickout bed 207 for later label placement. Optionally, the systems 200 may be capable of recovering sufficiently quickly such that a new, correct label may be readily printed and applied to the article while it is still present at the LPA bed 205 (such as in times of low throughput demand). When an article has passed verification, the article will pass the kickout bed 207 and continue to a downstream process, such as into or onto a shipping or loading dock area 212 via a transfer conveyor system, for example (see FIG. 1).

Figure 3:
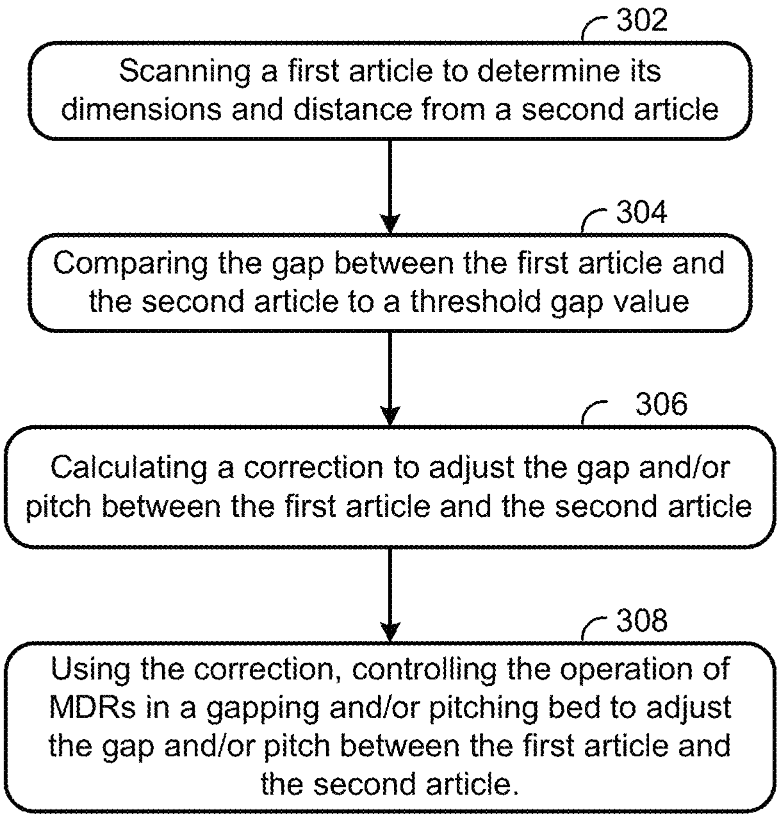
FIG. 3 is a flow diagram of an exemplary method for receiving and handling articles in an auto sort and label system in accordance with an embodiment of the present invention.

As illustrated in FIG. 3, the steps to an exemplary method for dynamically adjusting the spacing (gap) and/or pitch between articles on a conveyor system includes the following steps. In step 302 of FIG. 3, a first article is scanned with a sensor array 220 to determine its dimensions and to determine its distance from a second article downstream that has been transported ahead of the first article. In step 304 of FIG. 3, the gap or distance between the first article and the second article downstream is compared to a threshold or desired gap or distance value. The threshold gap or distance value may be predefined by a user or may be dynamically based upon the dimensions of the first article and the downstream second article. Likewise, an optimal pitch may be predefined by a user or may be dynamically based upon the dimensions of the first article and the downstream second article. In step 306 of FIG. 3, a correction is calculated to properly adjust the gap and/or pitch between the first article and the downstream second article to meet the threshold gap and/or optimal pitch. In step 308 of FIG. 3, using the correction, the operation of MDRs in a gapping and/or pitching bed 203 are controlled by the controller 230 to adjust the gap and/or pitch between the first article and the downstream second article to match the desired gap and/or pitch to optimize the efficiency and uninterrupted operation of the LPA 208.

Figure 4:
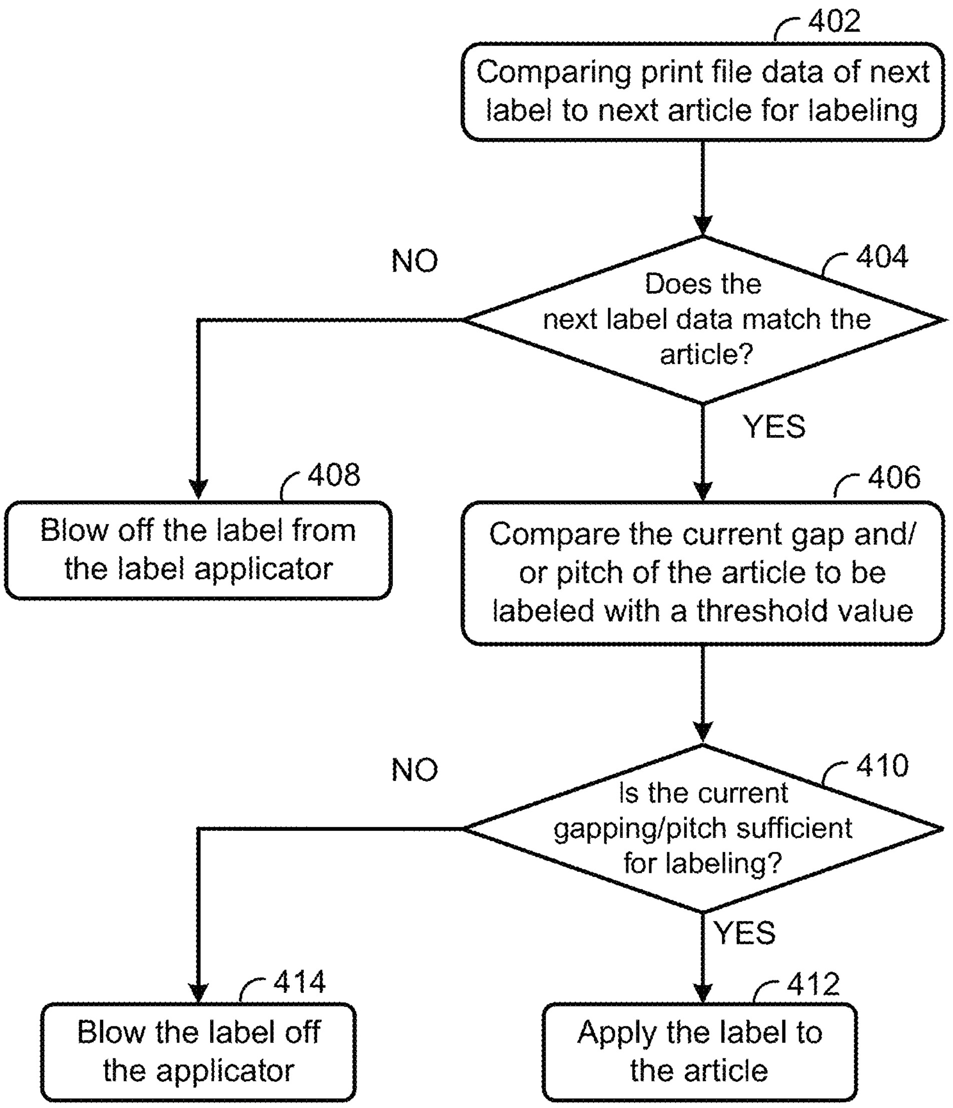
FIG. 4 is a flow diagram of an exemplary method for evaluating the file data to an article and evaluating the gapping/pitch of the article before label application in an embodiment of the present invention.

As illustrated in FIG. 4, the steps to an exemplary method for evaluating an article before label application includes the following steps. In step 402 of FIG. 4, label print data (such as a zebra programming language (ZPL) string) for a next label to be printed is compared to a next article for labeling, such as indicated or determined based on information provided to a controller 230 from a sensor array 220 at a scanning bed 204 of an exemplary ASL system 200. In step 404 of FIG. 4, a determination is made as to whether the next label data matches the article to be labeled. This may include comparing the label data to the article ID. If the next label data matches the article to be labeled, the method continues with step 406 of FIG. 4. If the next label data does not match the article to be labeled, the method continues with step 408 of FIG. 4. In step 406 of FIG. 4, the current gap and/or pitch of the article to be labeled is compared to a threshold value for an optimal gapping and/or pitch of the article to be labeled, in which the optimal gap/pitch may be determined as a function of the operation capabilities of the label applicator of an LPA 208. In step 408 of FIG. 4, the label is discarded from the label applicator, such as blown off into the air via the label applicator of exemplary LPA 208. In blowing off the label, the label applicator applies air to the label to blow the label off into the air. In step 410, which follows step 406 of FIG. 4, a determination is made as to whether the current gapping and/or pitch (with respect to threshold values) is sufficient for labeling. If there is sufficient gapping and/or pitch for labeling, the method continues on to step 412 of FIG. 4. If there is insufficient gapping and/or pitch for labeling, the method continues on to step 414 of FIG. 4. In step 412 of FIG. 4, the label is applied by the applicator to the article. In step 414 of FIG. 4, similar to step 408, the label is blown off the applicator.

It will be appreciated that the features, functions, and benefits of the exemplary ASL systems 100, 200, and method 300 may be adapted or applied for use with other LPAs and ASL systems.

Thus, exemplary ASL systems 100 and 200 provide for efficient, uniform, and timely labeling of articles through the use of dynamic gap and/or pitch adjustment (via utilization and dynamic control of individually controlled as opposed to less responsive and configurable belt conveyors) to maximize article handling rates through the systems. The ASL systems 100 and 200 include an automatic recovery for errors in the system to minimize or eliminate stoppages and slowdowns of the conveyor system that negatively affect throughput. Such errors include an out-of-sequence label application, out of sequence, mis-oriented, mis-gapped and/or mis-pitched articles, and/or an inadequately printed or applied label. Through the use of dynamic gap and/or pitch adjustment and multi-variant matching algorithms the ASL systems 100 and 200 is well-suited for automatically recovering from an insufficient gap and/or pitch errors, efficiently marrying label printing and application with article identification and transport to, through, and past the label applicator, and seamlessly removing articles without labels or mis-applied labels.

Changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. An auto sort and label (ASL) system comprising:

a conveyor configured to convey a plurality of articles through the ASL system, the conveyor having a linear conveying direction and a conveyor length extending along said ASL system;

a sensor array being positioned along the conveyor and extending along the conveyor length and configured to detect and identify each article of the plurality of articles on the conveyor;

a controller configured to receive sensor data from the sensor array and to determine a gap and/or a pitch between adjacent ones of the articles and configured to control the conveyor to dynamically adjust the gap and/or the pitch between adjacent ones of the articles if the determined gap and/or pitch is not within a predefined gap and/or pitch;

a label, print, and apply system (LPA) configured to print and apply a label to each article, wherein the LPA is positioned with respect to the conveyor such that the LPA can interact with the articles upon the conveyor as they pass by;

wherein the conveyor comprises a plurality of individually addressable motorized driven rollers (MDRs) and the controller is configured to individually control the MDRs such that the gap and/or the pitch between adjacent ones of the articles is dynamically adjusted while the articles are conveyed along the linear conveying direction of the conveyor to the LPA to ensure that the label is ready prior to each article arriving at the LPA;

wherein the controller is configured to select a print string for the LPA as defined by the identity of each article, and wherein the LPA is configured to print and apply labels to each respective article as defined by the respective print strings;

wherein the controller is configured to verify placement and contents of each respective label upon each article as defined by the sensor data from the sensor array; and wherein the controller is configured to accept or reject a labeled article for further handling.

2. The ASL system of claim 1, wherein the sensor array comprises a first sensor array and a second sensor array, the first sensor array configured to determine an identity of each article of the plurality of articles, and the second sensor array configured to verify a labeled article.

3. The ASL system of claim 2, wherein the first sensor array and the second sensor array are part of a single sensor array.

4. The ASL system of claim 1, wherein the conveyor comprises a belted conveyor.

5. The ASL system of claim 1, wherein the sensor array comprises a plurality of cameras and/or a plurality of barcode scanners, and/or a plurality of photo eyes.

6. The ASL system of claim 1, wherein the LPA comprises a label applicator configured to apply the label to each article by releasing a measured quantity of air to blow the label onto each article.

7. The ASL system of claim 6, wherein the controller and/or the LPA is configured to determine whether a current print string matches an article, and wherein the label applicator is configured to blow off the label into the air when the current print string does not match the article.

8. The ASL system of claim 1, wherein the controller is configured to direct the conveyor to allow a verified article of the plurality of articles to proceed to further handling.

9. The ASL system of claim 8, wherein the controller is configured to direct the conveyor to kick an unverified article of the plurality of articles off the conveyor and into a holding bin for further handling.

10. The ASL system of claim 1, wherein the LPA is configured to handle and apply labels onto a wide range of material to be handled (MTBH), wherein the MTBH comprises articles of 3 mm thick padded envelopes that weight under 1 pound up to packages 25 inches tall that weight up to 60 pounds.

11. The ASL system of claim 1, wherein the controller is configured to control the conveyor to increase or decrease the gap and/or increase or decrease the pitch between adjacent ones of the articles if the determined gap and/or pitch is not within the predefined gap and/or pitch.

12. An auto sort and label (ASL) system comprising:

a conveyor configured to convey a plurality of articles through the ASL system, the conveyor comprising a plurality of individually addressable motorized driven rollers (MDRs) and having a linear conveying direction and a conveyor length extending along the ASL system;

a sensor array being positioned along the conveyor and extending along the conveyor length, the sensor array configured to detect and identify each article of the plurality of articles;

a controller configured to receive sensor data from the sensor array and to individually control the MDRs of the conveyor to dynamically adjust a gap and/or a pitch between adjacent ones of the articles based on the sensor array data;

a label, print, and apply system (LPA) configured to print and apply a label to each article of the plurality of articles, wherein the LPA is positioned with respect to the conveyor such that the LPA can interact with the articles upon the conveyor as they pass by in the linear conveying direction;

wherein the controller is configured to select a print string for the LPA as defined by the identity of each article, and wherein the LPA is configured to print and apply the label to each article based on the print string; and wherein the controller is configured to accept or reject the label or a labeled article for further handling when the controller determines the current gapping and/or pitch between the articles while being conveyed by the conveyor along the linear conveying direction is insufficient for labeling.

13. The ASL system of claim 12, wherein the controller and/or the LPA is configured to determine whether the label has been improperly printed, and wherein the LPA is configured to discard the label when the label has been improperly printed before application to the first article.

14. The ASL system of claim 13, wherein the LPA comprises a label applicator, and wherein either (i) the LPA is configured to apply the label to an article by releasing a measured quantity of air by the label applicator to blow the label onto the article, or (ii) the label applicator is configured to discard the label into the air when the label has been improperly printed before application to the article.

15. The ASL system of claim 13, wherein the controller is configured to control the conveyor such that the gap and/or the pitch between adjacent articles is adjusted to reach a threshold gap.

16. The ASL system of claim 15, wherein the controller is configured to determine whether a determined current gap and/or pitch between adjacent articles is sufficient or insufficient for labeling.

17. The ASL system of claim 16, wherein the LPA comprises a label applicator, and when the controller determines the current gap and/or pitch between adjacent articles is insufficient for labeling, the label applicator is configured to discard the label.

18. The ASL system of claim 16, wherein the controller and/or the LPA is configured to determine whether a current print string matches an article, and wherein when the current print string matches the article, the LPA is configured to print the label based on the current print string, and wherein the LPA is configured to apply the label printed with the current print string to the article.

19. The ASL system of claim 12, wherein the controller is configured to kick an unlabeled or mislabeled article of the plurality of articles off the conveyor and into a holding bin for further handling.

20. The ASL system of claim 12, wherein when the conveyor comprises a belted conveyor.

21. The ASL system of claim 12, wherein the LPA is configured to handle and apply labels onto a wide range of material to be handled (MTBH), wherein the MTBH comprises articles of 3 mm thick padded envelopes that weight under 1 pound up to packages 25 inches tall that weight up to 60 pounds.

* * * * *